J. SEMPLE.
Traction-Wheel.
No. 4,029.  Patented May 1, 1845.
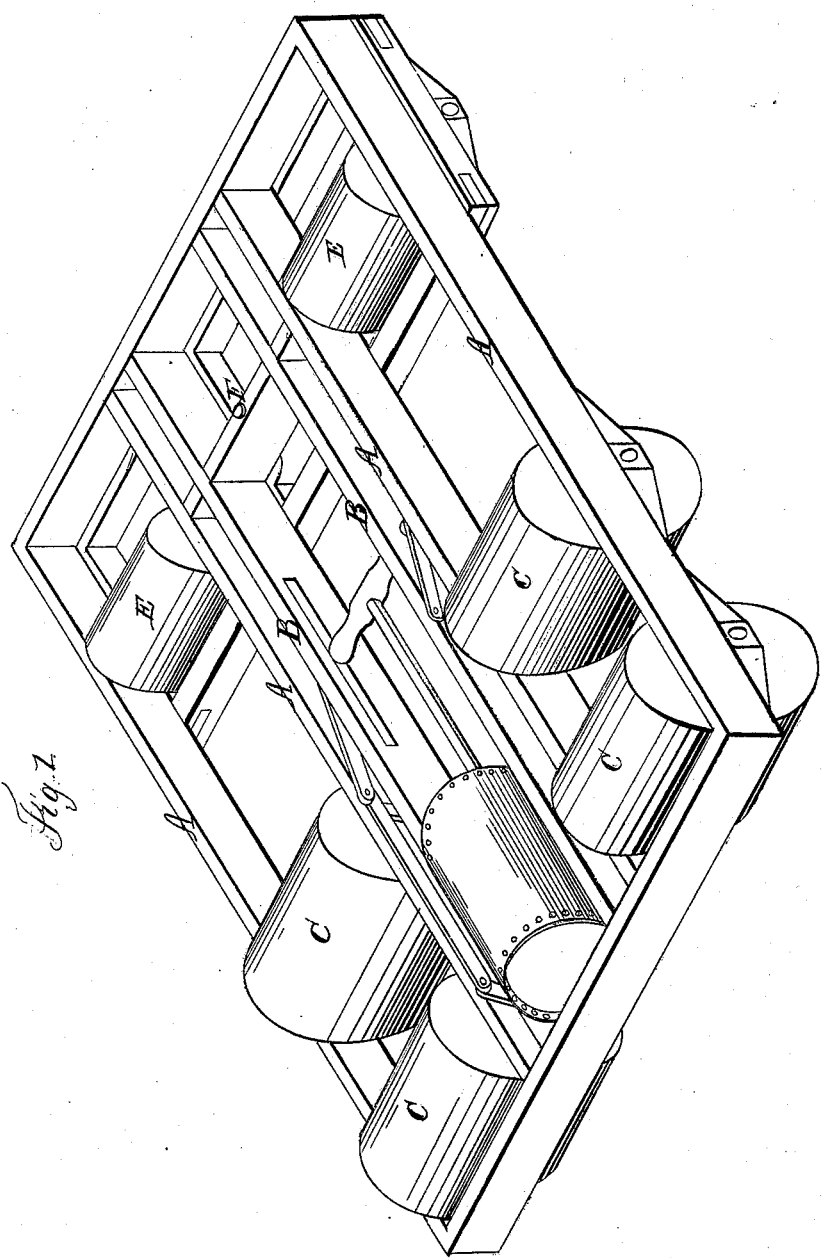

UNITED STATES PATENT OFFICE.

JAMES SEMPLE, OF ALTON, ILLINOIS.

STEAM-COACH ADAPTED TO THE PRAIRIES.

Specification of Letters Patent No. 4,029, dated May 1, 1845.

*To all whom it may concern:*

Be it known that I, JAMES SEMPLE, of the city of Alton, in the county of Madison and State of Illinois, have invented a new and useful machine or vehicle for traversing and conveying freight and passengers over prairies, as well as over common earthen roads made for such machine or vehicle, which I call the "prairie-car," of which the following is a full and accurate description, viz:

I construct a frame in the shape of a parallelogram twenty-six feet long and nineteen feet wide, more or less, with two or more cross pieces, all strongly ironed and bolted together. See A, A, A, A, Figure 1, in the drawing. I add two longitudinal beams, to which may be attached the driving power, and the necessary machinery B, B. Between the parallel timbers on each side of the frame, I run four driving wheels C, C, C, C, each on a separate axle, or two on one axle as may be desired for two or four steam cylinders, and to which I apply the power at D, D.

The driving wheels C, C, C, C, I construct in the following manner, viz: They are hollow cylinders of iron or wood, six feet in diameter, and five feed tread, more or less, closed at the ends. The object in making them so wide is to prevent their sinking into the soft earth, and they are made hollow and closed at the ends to give them greater lightness and buoyancy, and to prevent mud, water or other material from getting into them. They may be made rough on the outside surface to give them greater adhesion.

The guiding wheels E, E, are on a separate frame, which turns on a pivot at F, and slides under the main frame as shown at G, in Fig. 1. They are made like the driving wheels and always on separate axles, and are five feet in diameter, with four and a half tread, more or less. The size will be as much less in diameter than the driving wheels, as will make the lower part of the wheels on a level with the driving wheel, when the center is placed below the guiding frame G, as shown in Fig. 1, and the tread will be sufficiently narrow to allow the wheel to play within the large frame while turning a curve say on a radius of 400 feet. The guiding frame is turned in the same manner that steam coaches are turned on common roads.

The power is applied by any of the ordinary modes.

This description applies to the locomotive.

The freight and passenger cars will be made with the same kind of wheels, four or eight in number, each wheel on a separate axle, and the forward wheels are affixed to a movable frame work like the guiding wheels of the locomotive.

The locomotive and cars are attached together in any of the ordinary modes.

The power or manner of applying the same for propelling this car is not claimed as a new invention; this may be done in any of the various ways already known. I am aware that the tread of wheels for carriages has been made of sufficient width to prevent the cutting up of roads by the weight of common wagons gun carriages &c. drawn by horses—and that the extra width has been given to the treads of wheels for steam carriages on macadamized and other roads with the view of obtaining sufficient adhesion or resistance to the wheels, which being turned by steam power are termed driving wheels; but I am not aware that it has ever been suggested to make the tread of the wheels of steam carriages of sufficient width to sustain the weight on prairies in their various conditions, and on soft roads when such wheels are to be driven by steam power: and Therefore what I claim as my invention and desire to secure by Letters Patent is—

The combination of the broad high cylindrical wheels turning on separate axles, spreading out the surface or bearing so as to prevent sinking into the ground, with a locomotive steam engine or other driving power located on the carriage as herein described.

JAMES SEMPLE.

Witnesses:
J. J. GREENOUGH,
T. C. DONN.